United States Patent [19]

Hesketh et al.

[11] Patent Number: 4,514,274

[45] Date of Patent: Apr. 30, 1985

[54] ELECTRODE FOR ELECTROCHEMICAL PROCESSES

[75] Inventors: Bernard Hesketh, Frodsham; Nicholas W. J. Pumphrey, Runcorn, both of England

[73] Assignee: Imperial Chemical Industries PLC, London, England

[21] Appl. No.: 92,515

[22] Filed: Nov. 8, 1979

Related U.S. Application Data

[63] Continuation of Ser. No. 450,200, Mar. 11, 1974, abandoned, which is a continuation-in-part of Ser. No. 289,742, Sep. 15, 1972, abandoned.

[30] Foreign Application Priority Data

Sep. 16, 1971 [GB] United Kingdom ............... 43190/71
Oct. 26, 1973 [GB] United Kingdom ............... 49898/73

[51] Int. Cl.$^3$ ............................................. C25B 11/00
[52] U.S. Cl. ................................................. 204/290 F
[58] Field of Search ..................................... 204/290 F

[56] References Cited

U.S. PATENT DOCUMENTS

| | | | |
|---|---|---|---|
| 3,562,008 | 2/1971 | Martinsons | 427/126 |
| 3,616,445 | 10/1971 | Bianchi et al. | 204/290 F |
| 3,627,669 | 12/1971 | Entwisle et al. | 204/290 F |
| 3,645,862 | 2/1972 | Cotton et al. | 204/56 R |
| 3,649,485 | 3/1972 | Chisholm | 204/95 |
| 3,654,121 | 4/1972 | Keith et al. | 204/290 F |
| 3,701,724 | 10/1972 | Entwisle et al. | 204/290 F |
| 3,778,307 | 12/1973 | Beer | 204/290 F X |

Primary Examiner—John F. Niebling
Attorney, Agent, or Firm—Cushman, Darby & Cushman

[57] ABSTRACT

Electrodes comprising a film-forming metal support and a conductive coating in which is embodied a non-conducting particulate or fibrous refractory material. Preferred refractory materials include oxides which may be present as single oxides, binary oxides, ternary oxides and complex oxides, and also carbides, sulphides, nitrides and fluorides.

12 Claims, No Drawings

ELECTRODE FOR ELECTROCHEMICAL PROCESSES

This is a continuation of application Ser. No. 450,200, filed Mar. 11, 1974, now abandoned, which is a continuation-in-part of Pumphrey et al. Ser. No. 289,742, filed Sept. 15, 1972, now abandoned.

The present invention relates to electrodes for electrochemical processes. More particularly it relates to electrodes comprising a support member made of a film-forming metal or a film-forming metal alloy carrying an electrocatalytically active coating.

In recent times it has been proposed to employ as electrodes in electrochemical cells, particularly as anodes in cells for the electrolysis of alkali-metal chloride solutions, a structure which comprises a support member made of a film-forming metal or film-forming metal alloy, usually titanium, and on the support member an electrocatalytically active coating which is resistant to electrochemical attack but is active in transferring electrons between the electrolyte and the electrode. The electrolytically active material of the coating may most suitably consist of one or more oxides of the platinum group metals, particularly ruthenium dioxide, and in order to anchor this material more securely to the support member it may be deposited on the support member in admixture with an oxide of a film-forming metal, eg titanium dioxide, to form the coating.

Coatings of this type exhibit high catalytic activity in chloride electrolytes, ie they have a low over-potential for the liberation of chlorine. The loss of the expensive platinum group metal from the coatings is also advantageously low under normal conditions of operation, even when the electrodes are used as anodes in mercury-cathode cells. However, the coatings are not entirely resistant to damage by short-circuit contact with a mercury cathode and, since accidental short-circuiting cannot always be avoided, reduced life-times for the electrode coatings can be experienced in mercury-cathode cells.

The present invention provides an improvement in electrodes of the type comprising an electrocatalytically active coating carried on a support member made of a metal or an alloy having anodic film-forming properties, whereby increased resistance to damage by short-circuiting to a mercury cathode is provided.

According to the present invention, therefore, we provide an electrode for electrochemical processes, which comprises a support member made of a film-forming metal or a film-forming metal alloy and an electrocatalytically active coating thereon, which coating consists of a matrix of electroconducting material having electrocatalytic properties and embedded in the said matrix a non-conducting particulate or fibrous refractory material.

Preferably, the non-conducting particulate or fibrous refractory material is selected from the group consisting of oxides, carbides, sulphides, nitrides and fluorides.

In this specification by "a film-forming metal" we mean one of the metals titanium, zirconium, niobium, tantalum or tungsten. By "a film-forming metal alloy" we mean an alloy based on one of the said film-forming metals and having anodic polarisation properties similar to those of the commercially pure film-forming metal.

The support member of the electrode is made of one of the film-forming metals titanium, zirconium, niobium, tantalum or tungsten or a film-forming metal alloy. Preferably the support member is made of titanium or an alloy based on titanium and having anodic polarisation properties similar to those of titanium.

The matrix of the electrode coating may be formed of any electroconducting material which has electrocatalytic properties, ie which is active in transferring electrons from an electrolyte to the underlying film-forming metal or alloy structure of the electrode, and which is resistant to anodic attack in an aqueous electrolyte containing chloride ions. It may for instance consist of one or more of the platinum group metals, ie platinum, rhodium, iridium, ruthenium, osmium and palladium and/or oxides of one or more of these metals, rhenium, rhenium trioxide, magnetite, titanium nitride and the borides, phosphides and silicides of the platinum group metals. It may consist of one or more of the said platinum group metals and/or oxides thereof in admixture with one or more non-noble metal oxides. Alternatively, it may consist of one or more non-noble metal oxides alone or a mixture of one or more non-noble metal oxides and a non-noble metal chlorine discharge catalyst. Suitable non-noble metal oxides are, for example, oxides of the said film-forming metals, tin dioxide, germanium dioxide and oxides of antimony. Suitable chlorine-discharge catalysts include the difluorides of manganese, iron, cobalt, nickel and mixtures thereof, for example as described in the specification of our U.K. Pat. No. 1,277,033. Especially suitable electroconducting materials according to the invention include platinum itself and those based on ruthenium dioxide/titanium dioxide and ruthenium dioxide/tin dioxide/titanium dioxide.

The non-conducting refractory materials which are suitable for use according to the present invention are any particulate or fibrous materials which are chemically stable and resistant to melting at the temperatures employed during the preparation of the coating (for example in the region of 400° C. to 500° C.), are resistant to electrochemical attack, are non-conducting, and have electrical properties which are not in the form used in this invention significantly changed by chemical interaction with the electrocatalytically active material used in the matrix during the preparation process. By the term "non-conducting" is usually meant insulating materials with an electrical resistivity at room temperature in the range about $10^{14}$ to about $10^{22}$ ohm-cm as distinct from good conductors having a resistivity of about $10^{-5}$ ohm-cm and semi-conductors having a resistivity of about $10^{-2}$ to about $10^9$ ohm-cm (cf. 'Introduction to Solid State Physics', by C Kettel Wiley and Sons, New York, 1953). In the present specification, we mean that the refractory material is non-conducting relative to the electroconducting material used in the matrix, and such refractory materials include those having a resistivity greater than about 10 ohm-cm, and preferably in the region $10^{10}$ to about $10^{22}$ ohm-cm.

By the term "embedded" we include any coatings in which the non-conducting refractory particles or fibres are bound together by the electroconducting material of the matrix.

By the term "oxides" we include single oxides, binary oxides, ternary oxides and more complex oxides.

Suitable single oxides for use as refractory non-conducting materials according to the invention include zirconia, alumina, silica, thorium oxide, titanium dioxide, ceric oxide, hafnium oxide and ditantalum pentoxide.

Suitable binary oxides include aluminosilicates, e.g. mullite, magnesium aluminate, zirconium silicate, calcium silicate, calcium aluminate, calcium titanate, eg perovskite, and calcium zirconate.

Suitable ternary oxides and complex oxides include aluminosilicates such as attapulgite, kaolinite, asbestos, mica, bentonite and cordierite, and various glass formulations.

Suitable carbides include niobium carbide, suitable sulphides include dicerium trisulphide, and suitable nitrides include boron nitride and silicon nitride. Suitable fluorides include calcium fluoride.

The aforesaid refractory materials may be present in either their naturally-occurring form or as synthetic materials.

The preferred refractory material is zirconium silicate, which is conveniently used in particulate form. The zirconium silicate may be present as the naturally-occurring zircon or as the synthetic compound obtained, for example, by heating a mixture of the component oxides, $ZrO_2$ and $SiO_2$, or by heating a mixture of compounds which give rise to the component oxides on heating.

The zirconium silicate may be admixed with zirconia, whence it is preferred to use a mixture of zirconium silicate particles and zirconia fibres (for example zirconia fibres prepared as described in our copending U.K. patent applications Nos. 12088/73, 36693/72, 4369/71 and 29909/70).

Non-fibrous particulate refractory materials of a wide size range may be used, for example from 0.05 to 200 microns, although the particulate refractory materials are preferably in the size range from 0.1 to 75 microns.

Preferably the refractory fibres employed are such that no dimension of the individual fibre exceeds 1 mm.

The electrodes of the invention may be prepared by adapting the painting and firing technique wherein a coating of metal and/or metal oxide is formed on a film-forming metal support member by applying a layer of a paint composition comprising thermally-decomposable compounds of each of the metals that are to feature in the finished coating in a liquid vehicle to a cleaned and/or etched surface of the support member, drying the paint layer by evaporating the liquid vehicle and then firing the paint layer by heating the coated support member, suitably at 250° C. to 800° C., to decompose the metal compounds of the paint and form the desired coating. The refractory particles or fibres may be mixed into the aforesaid paint composition before it is applied to the support member. Alternatively, refractory particles or fibres may be applied on to a layer of the aforesaid paint composition while this is still in the fluid state on the surface of the support member, the paint layer then being dried by evaporation of the liquid vehicle and fired in the usual manner.

The coated electrodes are preferably built up by applying a plurality of paint layers on the support member, each layer being dried and fired before applying the next layer. Preferably this same technique of applying a plurality of paint layers and drying and firing each layer is employed in preparing electrodes according to the present invention using either of the methods described above.

The refractory particles or fibres may be present in each of the layers of paint that are applied to build up the coating.

When the refractory material is in the form of fibres of median length greater than 50 microns and is deposited on the surface of the paint film after this has been applied to the support member and while it is still in the fluid state, it is preferred to add the fibres to only the first layer or the first two layers of paint that are applied to the support member, ie any subsequent layers of paint are then laid down without any further addition of the refractory material to the coating. When the refractory material is in non-fibrous particulate form or in the form of very short fibres (less than 50 microns median length), it is preferred to incorporate the material in the paint composition before the paint is applied to the support member and to include the refractory material in all or in the final layers of paint that are applied to build up the coating.

The proportion of particulate or fibrous refractory material embedded in the matrix of the coating is preferably between 5% and 95% by volume calculated on the total volume of the components in the coating as defined below. In general, increasing the proportion of particulate or fibrous refractory material leads to a continuous improvement in the shorting resistance of the coating thus obtained, although even quite low proportions of refractory material (for example 5% to 20% by volume) still have a beneficial effect with respect to shorting resistance, especially if the refractory material is added to the final surface layer or layers. The preferred proportions of refractory material are in the range 20% to 90% by volume calculated on the total volume of the components in the coating.

The volume percentage values of the particulate or fibrous refractory material are based on the volumes of the components of the coating, the said volumes being calculated from the known weights of the various components in the coating and the specific gravities of these components (for example, as given in "The Handbook of Chemistry and Physics", 53rd edition, 1972–3 published by the Chemical Rubber Company). No account is taken of porosity in making this calculation.

In preferred electrodes according to the present invention, the matrix of the coating comprises at least one platinum group metal in the elementary and/or the oxidised state and an oxide of at least one film-forming metal. For the manufacture of these preferred electrodes, suitable thermally-decomposable compounds of the platinum group metals for use in the aforesaid paint compositions are the halides and halo-acid complexes of the platinum group metals, eg $RuCl_3$, $RhCl_3$, $H_2PtCl_6$, $H_2IrCl_6$ and organo-compounds of the platinum group metals, eg resinates and alko-oxides of these metals. Suitable thermally-decomposable compounds of the film-forming metals are alkoxides, alkoxy-halides in which the halogen is chlorine, bromine or fluorine and resinates of these metals. Most preferred, especially when the electrode support member that is to be coated consists of titanium or a titanium alloy, are the alkyl ortho-titanates, partially-condensed (hydrolysed) derivatives of these, which are usually referred to as alkyl polytitanates, and alkyl halotitanates wherein the halogen is chlorine, bromine or fluorine, especially those compounds of these classes wherein the alkyl groups contain two to four carbon atoms each.

The paint composition is made by dissolving or dispersing a thermally-decomposable compound of at least one platinum group metal and a thermally-decomposable compound of at least one film-forming metal in a liquid vehicle, preferably a lower alkanol, eg an alkanol containing two to six carbon atoms per molecule. The refractory particles or fibres are suspended in this paint composition if they are to be applied to the electrode support member at the same time as the paint film.

When the platinum group metal is to be present in the matrix of the finished coating wholly or preponderantly in the elementary state, a reducing agent, eg linalool, is included in the paint composition and the temperature at which each paint layer is fired is restricted to approximately 450° C. maximum.

The coating of the finished electrode very suitably consists of a mixture of platinum group metal oxide and film-forming metal oxide containing 5% to 65% (preferably 25% to 50%) by weight of platinum group metal oxide forming the aforesaid matrix, together with particulate or fibrous refractory material embedded in the said matrix in amount between 5% and 95% by volume calculated on the total volume of the components in the coating as defined hereinbefore.

The most preferred electrodes according to the invention for use as anodes in a mercury-cathode cell comprise a support member of titanium or an alloy based on titanium and a coating thereon which comprises 20% to 90% by volume as defined above of the non-conducting particulate or fibrous refractory material, especially zirconium silicate, in a matrix of ruthenium dioxide and titanium dioxide containing 50% to 75% by weight of titanium dioxide (most suitably 65% to 70% by weight of titanium dioxide). According to one modification of this embodiment of the invention, however, up to 50% by weight of the ruthenium dioxide and titanium dioxide in the said matrix may be replaced by one or more of tin dioxide, germanium dioxide and oxides of antimony as described and claimed in the specification of our U.K. application No. 7467/71. Preferred coatings of this modified type consist of a matrix which is a three-component mixture of 27% to 45% by weight ruthenium dioxide, 26% to 50% by weight titanium dioxide and 5% to 48% tin dioxide by weight together with 20% to 90% by volume of particulate or fibrous refractory material, especially zirconium silicate.

As a further modification coatings may comprise tin dioxide, germanium dioxide and oxides of antimony which may further include a chlorine-discharge catalyst other than a noble-metal or noble-metal oxide as hereinbefore described. Preferred coatings of this type consist of a matrix which is a three component mixture of tin dioxide and oxides of antimony (calculated as $Sb_2O_3$) in the weight ratio $SnO_2:Sb_2O_3$ from 5:1 to 100:1 with 0.1% to 1.0% by weight manganese difluoride, together with 20% to 90% by volume of non-conducting particulate or fibrous refractory material, especially zirconium silicate.

These modified coatings are suitably obtained by including thermally-decomposable compounds of one or more of tin, germanium and antimony in the paint composition. Suitable thermally-decomposable compounds of tin, germanium and antimony include the alkoxides of these respective elements, their alkoxyhalides wherein the halogen is chlorine, bromine or fluorine and antimony halides.

It will be understood that the relative proportions of thermally-decomposable compounds of platinum group metal, of film-forming metal, and/or of tin and/or germanium and/or antimony in the paint composition employed to form the matrix of the electrode coating will be adjusted to correspond on a chemically equivalent basis with the relative proportions of these elements and/or their oxides desired in the matrix.

While the electrodes of the present invention are particularly useful as anodes in mercury-cathode cells for electrolysing alkali-metal chloride solutions, they can also be used in other electrochemical processes, including other electrolytic processes, electrocatalysis as for instance in fuel cells, electrosynthesis and cathodic protection.

The invention is further illustrated by the following Examples:

EXAMPLE 1

One coat of a paint consisting of a 3 g ruthenium trichloride (40% Ru by weight), 18.7 g n-pentanol and 12 g tetrabutyl orthotitanate was sprayed on to a titanium strip 350 mm × 6 mm × 1 mm, which had previously been etched in oxalic acid solution at 80° C. While the paint coat was still wet, chopped silica fibre (fibre diameter 15 microns, lengths from 10 to about 600 microns) in amount of about 80 g/m$^2$ of the painted surface was sprinkled on to the paint layer and allowed to adhere to the paint. The paint was then dried at 180° C. and afterwards fired at 450° C. in air. Seven further coats of the paint were then applied, each coat being dried at 180° C. and fired at 450° C. in air, without any further addition of silica fibre.

Samples cut from the coated strip exhibited a low overpotential (55 mV at a current density of 8 kA/m$^2$) when tested as anodes for chlorine production in sodium chloride brine containing 21.5% NaCl at pH 2–3 and a temperature of 65° C. When connected as a vertical-strip anode in a mercury-cathode cell electrolysing sodium chloride brine and immersed to a depth of 4 mm in the mercury cathode a sample passed a current equivalent to 3.5 A/cm horizontal length of strip immersed. A similar sample cut from a titanium coated in an identical manner except that no silica fibres were incorporated in the coating passed a current equivalent to 10 A/cm length when immersed under identical conditions.

EXAMPLE 2

A paint was prepared consisting of 3 g ruthenium trichloride (40% Ru by weight), 18.7 g n-pentanol and 12 g tetrabutyl orthotitanate, and 17.2 g thorium oxide powder (median particle size 15 microns as determined by sieve analysis distribution) were suspended in the paint. Six coats of this modified paint were sprayed on to a titanium strip 350 mm × 6 mm × 1 mm, which had previously been etched in oxalic acid solution at 80° C., each coat of paint being dried at 180° C. and then fired by heating the coated strip in air at 450° C. for 20 minutes.

Samples cut from the coated strip exhibited an overpotential for the liberation of chlorine of 150 mv at a current density of 10 kA/m$^2$ when used as an anode in the electrolysis of sodium chloride brine containing 21.5% w/w NaCl at pH 2.5 and a temperature of 65° C. When connected as a vertical-strip anode in a laboratory mercury-cathode cell electrolysing sodium chloride brine and immersed to a depth of 4 mm in the mercury cathode, a sample passed a short-circuit current equivalent to 3.5 A/cm horizontal length of strip immersed. A similar sample cut from a titanium strip coated in an identical manner except that no thorium oxide was suspended in the paint passed a current equivalent to 12–14 A/cm length when immersed under identical conditions.

EXAMPLE 3

Two full-scale anodes for a mercury-cathode cell having the working anode surface formed of parallel-spaced vertical titanium strips forming a horizontal grid of projected area 0.1 m² were etched in 10% w/w oxalic acid solution at 80° C., washed and dried. A paint consisting of 12 g ruthenium trichloride (40% Ru by weight), 75 g n-pentanol and 48 g tetrabutyl orthotitanate was prepared. A coat of this paint was sprayed on to each anode and, while the paint was still in the fluid state, chopped glass fibre carried by a stream of dry air was blown on the adhere to the wet paint film. Pilkington's alkali-resistant glass fibre, median diameter 20 micron and average length 600 micron, was used. The coating was then dried at 180° C. and fired by heating the coated anode in a furnace in air at 450° C. for 15 minutes. A second coat of paint and of glass fibre was applied, dried and fired in the same manner. A total mass of 5.8 g glass fibre was used for each anode. Seven further coats of the paint, but no more glass fibre, were then applied to each anode, each of these coats of paint being dried and fired as for the first two coats. The total weight of the matrix of ruthenium dioxide and titanium dioxide deposited from the paint was about 3.2 g per anode.

When tested in a pilot-plant mercury-cathode cell for the electrolysis of sodium chloride brine the two anodes performed with an electrolytic efficiency equal to that of anodes of the same design but containing no glass fibre in their coating. During operation in a full-scale mercury-cathode cell electrolysing sodium chloride brine these anodes were lowered deliberately into the mercury-cathode layer and the short-circuit currents were recorded.

The results in the following table show that the two anodes containing glass fibre in their coatings (reference numbers A193R and A183R respectively) passed only about one-third of the short-circuit current that was passed by a typical oxide-coated anode (having a coating containing the same proportion of $RuO_2:TiO_2$ but no glass fibre) when immersed to the same depth in the mercury-cathode layer under the same cell conditions.

| Anode Reference | Depth of Immersion in Mercury Cathode mm | Short-Circuit Current kA |
| --- | --- | --- |
| A193R | | |
| 1st short-circuit test | 4.8 | 2.6 |
| 2nd short-circuit test | 4.5 | 2.0 |
| A183R | 4.9 | 2.2 |
| Typical oxide-coated anode | 4.0 | 6.8 |

EXAMPLE 4

3 gm of ruthenium trichloride supplied by Johnson Matthey Chemicals Limited and containing 40% by weight of ruthenium was dissolved in 18.75 gm of n-pentanol. To this solution was added 12 gm of tetra n-butyl orthotitanate and 4.5 gm of "Zircosil 5"—a zirconium silicate of median particle size 1.25 microns, made by Associated Lead Manufacturers Limited ('Zircosil' is a registered trade mark). This weight composition was selected to give a composition by volume in the final coating of approximately 53% of $ZrSiO_4$ and 47% of titanium and ruthenium dioxides. The paint was mixed very thoroughly and applied by spraying to a previously etched experimental titanium anode section consisting of 6 parallel blades each 140 mm long × 6 mm high and 1 mm thick. The upper edges of the blades are fixed at one end to a current lead-in section of 3 mm thick titanium and at the other end to an angle piece of 2 mm thick titanium so that the blades are rigidly supported and remain aligned parallel.

When one coat of the paint had been applied to the titanium anode section the paint was dried at 180° C. and then fired in air at 450° C. to convert the paint to the ruthenium and titanium oxides. After cooling, a further coat of paint was applied, dried and fired. This was repeated until a sufficient number of coats of paint had been applied. The total loading of oxides plus zirconium silicate after firing was equivalent to 75 gm of coating per meter square of projected area of anode.

A similar experimental titanium anode section was coated in the same way but this time omitting the "Zircosil 5" from the paint. When electrolysing normally, both anodes passed the same current under identical conditions of temperature, brine strength, cell voltage etc. However, when immersed in the mercury cathode to a depth of 4 mm, the sample with "Zircosil 5" in the coating passed only 260 amps whereas the sample coated with the oxides of ruthenium and titanium alone took a shorting current in excess of 1000 amps.

The current taken by the sample coated with "Zircosil 5" in a matrix of mixed ruthenium and titanium oxides could be entirely accounted for by the electrolysis of the thin film of brine surrounding the blades; hence virtually no shorting current arising from direct anode to mercury amalgam cathode electronic contact was obtained.

EXAMPLE 5

26.7 gm of 'Hanovia 05X' liquid bright platinum paint manufactured by Engelhard Industries Limited was diluted with 13.3 gm of thinning essence. To this solution 4.5 gm "Zircosil 5" was added. The paint was thoroughly mixed and applied to an etched experimental titanium anode section similar to that described in Example 4.

In this case the sample was dried at 180° C. and then fired at 450° C. after each application of paint so as to produce a coating consisting of a matrix of electrocatalytically active platinum metal in which was dispersed the inorganic refractory additive. The total final loading was equivalent to 36 gm of coating (platinum plus $ZrSiO_4$) per meter square projected anode area. This loading corresponded to a composition by volume of approximately 9% platinum and 91% zirconium silicate ($ZrSiO_4$). The titanium strips thus coated had a low overpotential for chlorine evolution (80 mV at 10 kA/m²) and passed a current of only 2 to 4 amps/cm of titanium strip when immersed to a depth of 4 mm in flowing mercury with an applied voltage of 4.2 volts. A similar coating prepared from 'Hanovia 05X' paint but this time without the addition of "Zircosil 5", allowed a heavy current (greater than 100 amps/cm), to flow as soon as the anode sample touched the mercury surface.

EXAMPLE 6

A paint was mixed as in Example 4 except that 9 gm of "Zircosil F" was added in place of 4.5 gm of "Zircosil 5". "Zircosil F" is a zirconium silicate of median particle size of 25 microns made by Associated Lead Manufacturers Limited. This weight composition corresponded to a composition by volume in the final coating of approximately 31% of titanium and ruthenium dioxides plus 69% of ZrSiO$_4$. The paint was applied in the same manner as in Example 4, and an equally satisfactory coating in respect of the magnitude of the current drawn under short circuit conditions was obtained.

EXAMPLE 7

A paint of the same composition as in Example 6 was applied to a full size (0.1 m$^2$) anode. The total loading consisting of the oxides of ruthenium and titanium plus zirconium silicate was 7.5 gm. This anode was installed in a mercury cell alongside an anode which was in every way similar except that no "Zircosil F" was included in the coating. During a short duration contact between these anodes and the mercury cathode, the anode with "Zircosil F" in its coating passed 4 to 5 kA whereas under the same conditions the anode without "Zircosil F" in its coating passed 17 kA.

EXAMPLE 8

A paint was made from 3 gm ruthenium trichloride (containing 40% Ru by weight), 18.75 gm n-pentanol, 12 gm tetra n-butyl orthotitanate, 3 gm "Zircosil 5" and 2 gm "Saffil" (a zirconia containing fibre, diameter 2 microns, median length 20 microns prepared as described in U.K. application Nos. 12088/72, 36693/72 and 29909/70) to give a coating comprising 19% ZrO$_2$, 35% ZrSiO$_4$ and 45% RuO$_2$/TiO$_2$. A number of coats of this paint were applied to an experimental anode as in Example 4. When electrolysing normally this anode sample passed the same current as the anode sample incorporating "Zircosil 5" described in Example 4. When immersed in mercury this sample passed a low shorting current as did the sample incorporating "Zircosil 5". Furthermore, to illustrate the resistance to short-circuiting of these coatings the contact resistance between mercury and the anode surface was measured under standard conditions for the coatings consisting of (1) ruthenium and titanium oxides alone, (2) the coating containing ruthenium and titanium oxides and "Zircosil 5" as in Example 4, and (3) the coating described in this example.

The contact resistances were respectively 0.011 ohm cm$^2$, 0.11 ohm cm$^2$ and 1.96 ohm cm$^2$. The higher the contact resistance between mercury and the anode surface the lower will be the shorting current.

EXAMPLE 9

A paint was made from 3 gm ruthenium trichloride and 12 gm of tetra n-butyl orthotitanate in 25 gm of n-pentanol and to this was added 0.214 gm of "Zircosil 5". A number of coats of this paint were applied to a titanium anode section as in Example 4. This paint composition was formulated to yield a coating comprising 5% by volume of zirconium silicate particles in a matrix of 95% by volume of ruthenium and titanium dioxides. A strip of this coated section was immersed to a depth of 4 mm in a static pool of mercury under 21.5% w/w NaCl brine and a voltage of 3.5 volts was applied. The total current drawn was 1.12 amps per cm length of the titanium anode strip. Another anode section was also coated with a similar paint composition except, in this case, the "Zircosil 5" was omitted; this section passed 2.9 amps per cm length of strip under identical test conditions.

EXAMPLE 10

An alternative method for preparing shorting-resistant coatings is to include the particulate refractory material in only the outer layers of the coating. Two anode blade sections were coated in the manner of Example 4, but omitting the refractory additive, ie with ruthenium and titanium oxides alone. The total loading was 52 gm/m$^2$ projected area. Two and three coats of paint comprising 3 gm ruthenium trichloride, 12 gm of tetra n-butyl orthotitanate, 4 gm of "Zircosil F" and 25 gm of n-pentanol were then applied, dried and fired in the manner of the previous examples. This procedure yielded coatings containing, in toto, approximately 12% and 17% by volume of zirconium silicate. When subjected to the test described in Example 9, these anode samples passed currents of 1.41 and 1.06 amps per cm length of titanium strip respectively.

EXAMPLE 11

A paint was prepared from 3 gm ruthenium trichloride, 12 gm tetra n-butyl orthotitanate in 50 gm n-pentanol and to this was added 77.4 gm "Zircosil F". A number of coats of this paint were applied to an anode blade section and fired as in Example 4. This paint formulation was calculated to give a coating comprising 95% by volume "Zircosil F" and 5% by volume of ruthenium and titanium oxides. This sample was tested in a mercury pilot cell by immersing in the mercury stream flowing at 30 cm/sec surface speed. At 3 mm, depth of immersion and with an applied voltage of 4.2 volts, a current of 133 amps was drawn. Under similar test conditions a sample coated as above with ruthenium and titanium oxides but with no zirconium silicate present passed currents of over 1000 amps.

EXAMPLE 12

A paint was prepared from 3 gm of ruthenium trichloride, 12 gm tetra n-butyl orthotitanate in 25 gm n-pentanol. To this was added 0.27 gm of "Saffil" (a zirconia containing fibre prepared as described in our copending U.K. application Nos. 12088/72, 36693/72, 4369/71 and 29909/70) of diameter 2 microns and median length 20 microns. This paint composition was formulated to yield a coating comprising 5% by volume of zirconia in 95% by volume of titanium and ruthenium oxides. An anode section was coated with this paint as in Example 4 and the sample was subjected to the shorting test described in Example 8. At just over 1 mm depth of immersion and with an applied voltage of 4.2 volts, a current of 600 amps was drawn. A similar test using an anode section coated with only ruthenium and titanium dioxide passed a current of over 700 amps.

EXAMPLE 13

A paint was made from 3 gm ruthenium trichloride, 12 gm tetra n-butyl orthotitanate in 25 gm of n-pentanol. To this was added 9 gm of "Zircosil 200". This is a zirconium silicate powder of a somewhat coarser grade than "Zircosil F": whereas "Zircosil F" is milled to pass a British Standard screen of aperture size 53 microns, "Zircosil 200" is milled to pass a British Standard screen of aperture size 75 microns. This paint was applied in a number of coats to a titanium anode section in the manner of Example 4. The paint composition was formulated to yield a coating comprising 69% by volume of zirconium silicate and 31% by volume of ruthenium and titanium dioxides. A strip of the anode section was immersed to a depth of 4 mm in a static pool of mercury in a similar experiment to that described in Example 9. A current of 0.88 amps/cm length of titanium strip was drawn whereas a coating containing no added zirconium silicate passed 2.9 amps/cm length of strip under identical test conditions.

EXAMPLE 14

To a paint comprising 3 gm ruthenium trichloride, 12 gm of tetra n-butyl orthotitanate and 18.75 gm of n-pentanol was added 3 gm of 'Micro-Cote' which is a commercial grade of attapulgite—a complex hydrated magnesium aluminium silicate ('Micro-Cote' is a registered trademark of the Floridin Company, U.S.A.). The median particle size of the attapulgite powder is 3.3 microns. This paint was formulated to give a coating containing 58% by volume of attapulgite in a matrix of ruthenium and titanium dioxides which occupy 42% by volume of the total coating. The paint was applied to a titanium anode section as described in Example 4. A 3 cm strip of this coated section was immersed to a depth of 4 mm in a flowing mercury cathode under 21.5% w/w NaCl brine with an applied voltage of 4.2 volts. A total current of between 11 and 13 amps was drawn. A similar strip but coated with only ruthenium and titanium dioxides, under identical test conditions passed a current of over 30 amps.

EXAMPLE 15

A paint was made from 3 gm of ruthenium trichloride, 12 gm of tetra n-butyl orthotitanate and 25 gm of n-pentanol. To this was added 9 gm of 'Tioxide CL/D 718'—a commercial titanium dioxide powder (of rutile form) of median particle size 0.3 micron (which is about 30 times the size of the $RuO_2/TiO_2$ crystallites of a typical $RuO_2/TiO_2$ matrix), as supplied by British Titan Products Limited ('Tioxide' is a registered trademark). The paint was thoroughly mixed and applied to a titanium anode section in the manner described in Example 4. The paint formulation was designed to yield a coating containing 70% by volume of the $TiO_2$ particles in a matrix of ruthenium and titanium dioxides of proportion 30% by volume. A strip of the coated anode section was tested for its resistance to shorting in the experiment described in Example 6. With an applied voltage of 3.5 volts the total current drawn was 0.71 amps/cm of titanium strip; whereas a strip coated in a similar manner but containing no added particulate titanium dioxide passed 2.9 amps/cm length of strip under identical test conditions.

EXAMPLE 16

A coating consisting of the oxides of antimony and tin and manganese fluoride was prepared and applied to an etched titanium anode section according to the following procedure.

18 gm of antimony trioxide were boiled in concentrated nitric acid until evolution of oxides of nitrogen ceased. 84 gm of metallic tin were dissolved in concentrated nitric acid with heating, and the precipitated tin dioxide formed was thoroughly mixed with the precipitate of antimony oxide and heated for a further period in concentrated nitric acid. The precipitated mixture was washed free from acid and dried in air at 200° C. To the dried mixed oxides was added 3% by weight of manganese difluoride. The resultant mixture was pressed into pellets (100 lb/in$^2$) and fired in air in a furnace at 800° C. for 24 hours. After firing, the mixture was crushed and the particle size reduced to less than 60 microns. It was subsequently recompacted into pellets and fired as before at 1000° C. for 24 hours. The resultant material was crushed and the particle size reduced to less than 5 microns by ball milling.

A solution of an alkoxy-tin compound was prepared by boiling under reflux for 24 hours a mixture of 15 gm of stannic chloride and 55 gm of n-amyl alcohol. Into the resultant solution were dissolved 2.13 gm of antimony trichloride.

A composition suitable for coating on to an electrode support was prepared by suspending 0.17 gm of the above mixed fluoride/oxide material and 0.67 gm of "Zircosil 5" in 3.6 gm of the antimony-trichloride-alkoxy-tin solution. This coating composition was painted on to a strip of titantum which had been immersed overnight in a hot acid solution to etch the surface, and then washed and dried. The coating of paint was dried in an oven at 80° C. and heated in a furnace in air at 450° C. for 15 minutes to convert the coating substantially into a matrix of the oxides of antimony and tin with manganese difluoride in which is embedded zirconium silicate particles. The whole coating operation and final heating in air at 450° C. was then repeated three times to increase the thickness of the coating. The coating comprised approximately 59% by volume of zirconium silicate in 41% by volume of $SnO_2/Sb_2O_3/MnF_2$ (in the proportions by weight of 85%, 14% and 1% respectively).

A section of this coated strip was then tested for its resistance to shorting in mercury amalgam as described in Example 9. With an applied voltage of 3.5 volts under 21.5% w/w NaCl brine, the total current drawn was 0.20 amps/cm length of titanium strip.

EXAMPLE 17

A paint was prepared from 3 gm ruthenium trichloride, 12 gm tetra n-butyl orthotitanate in 25 gm of n-pentanol. To this was added and thoroughly mixed 5 gm of hafnium oxide of a median particle size 10.6 microns (supplied by British Drug Houses Limited). This paint composition was formulated to yield a coating comprising 37% by volume of hafnium oxide in 63% by volume of titanium and ruthenium oxides. An anode section was coated with this paint in a similar manner to that described in Example 4 and the sample was subjected to the shorting test described in Example 6. At a depth of 4 mm in a static pool of mercury under 21.5% w/w NaCl brine a current of 0.88 amp/cm length of the titanium strip was drawn for an applied voltage of 3.5 volts.

EXAMPLE 18

A coating was prepared in a manner similar to that described in Example 4 using a paint comprising 3 gm of ruthenium trichloride, 12 gm of tetra n-butyl orthotitanate, 25 gm of n-pentanol and 9 gm of ceric oxide. The ceric oxide, which was supplied by British Drug Houses Limited, was of a median particle size 10.5 microns. The paint composition should yield a coating comprising 59% by volume of ceric oxide in 41% by volume of titanium and ruthenium oxides. When a sample of the coating on titanium strip was subjected to the shorting test described in Example 9, a current of 1.06 amp/cm length of titanium strip was drawn for an applied voltage of 3.5 volts. This may be directly compared to the current of 2.9 amp/cm length of strip obtained from strips coated with ruthenium and titanium oxides alone and not containing refractory non-conducting additive.

EXAMPLE 9

A paint was prepared from 3 gm ruthenium trichloride, 12 gm of tetra n-butyl titanate in 75 gm of n-pentanol and to this was added 9 gm of boron nitride of median particle size 12.0 microns. The paint was applied to a titanium anode section and dried and fired in the manner described in previous examples. The final coatings should contain 82% by volume of boron nitride in a matrix of 18% by volume of ruthenium and titanium dioxides. When the sample was subjected to the shorting test described in Example 9 a current of 0.69 amp/cm length of titanium strip was drawn for an applied voltage of 3.5 volts. The improved shorting resistance of this coating was also exemplified by the relatively high contact resistance ($2.47 \times 10^{-1}$ ohm cm$^2$) measured across the coating/mercury interface (cf Example 5).

EXAMPLE 20

A paint comprising 3 gm ruthenium trichloride, 12 gm of tetra n-butyl titanate, 25 gm of n-pentanol and 5.26 gm of silicon nitride (median particle size 16.5 microns) was made up, applied to a titanium anode section and dried and fired in the manner of Example 4. The paint composition yielded a coating containing approximately 67% by volume of silicon nitride embedded in a matrix of ruthenium and titanium dioxides 33% by volume. When the titanium anode section was tested for its resistance to direct mercury contact by lowering into a static pool of mercury under 21.5% w/w NaCl brine, a current of 0.69 amp/cm length of titanium strip was drawn for a 4 mm depth of immersion at 3.5 volts. Coatings containing no refractory particles and only consisting of $RuO_2/TiO_2$ under the same test conditions pass currents in excess of 2.5 amps/cm length of titanium strip.

EXAMPLE 21

A paint was prepared from 3 gm ruthenium trichloride, 12 gm tetra n-butyl orthotitanate in 25 gm of n-pentanol. To this was added and thoroughly mixed 9 gm of calcium fluoride of a median particle size 15.5 microns (supplied by Hopkin & Williams Ltd).

This paint composition was formulated to yield a coating comprising 76% by volume of calcium fluoride in 24% of titanium and ruthenium oxides. An anode section was coated with this paint in a similar manner to that described in Example 4 and the sample was subjected to the shorting test described in Example 9. At a depth of 4 mm in a static pool of mercury under 21.5% w/w NaCl brine a current of 0.66 amp/cm length of the titanium strip was drawn for an applied voltage of 3.5 volts.

EXAMPLE 22

A paint was prepared from 3 gm ruthenium trichloride, 12 gm tetra n-butyl orthotitanate in 25 gm of n-pentanol. To this was added and thoroughly mixed 9 gm of niobium carbide of a median particle size 48 microns (supplied by Research Organic/Inorganic Chemical Co.).

This paint composition was formulated to yield a coating comprising 57.1% by volume of niobium carbide in 42.9% of titanium and ruthenium oxides. An anode section was coated with this paint in a similar manner to that described in Example 4 and the sample was subjected to the shorting test described in Example 9. At a depth of 4 mm in a static pool of mercury under 21.5% w/w NaCl brine a current of 0.95 amp/cm length of the titanium strip was drawn for an applied voltage of 3.5 volts.

EXAMPLE 23

A paint was prepared from 3 gm ruthenium trichloride, 12 gm of tetra n-butyl orthotitanate in 25 gm of n-pentanol. To this was added and thoroughly mixed 9 gm of bentonite of a median particle size 22 microns (supplied by Production Chemicals Ltd.).

This paint composition was formulated to yield a coating comprising 80.2% by volume of bentonite in 19.8% of titanium and ruthenium oxides. An anode section was coated with this paint in a similar manner to that described in Example 4 and the sample was subjected to the shorting test described in Example 9. At a depth of 4 mm in a static pool of mercury under 21.5% w/w NaCl brine a current of 0.54 amp/cm length of the titanium strip was drawn for an applied voltage 3.5 volts.

EXAMPLE 24

A paint was prepared from 3 gm ruthenium trichloride, 12 gm tetra n-butyl orthotitanate in 25 gm of n-pentanol. To this was added and thoroughly mixed 9 gm of kaolinite of a median particle size 17 microns (supplied by Hopkin & Williams Ltd.).

This paint composition was formulated to yield a coating comprising 79.3% by volume of kaolinite in 20.7% of titanium and ruthenium oxides. An anode section was coated with this paint in a similar manner to that described in Example 4 and the sample was subjected to the shorting test described in Example 9. At a depth of 4 mm in a static pool of mercury under 21.5% w/w NaCl brine a current of 0.41 amp/cm length of the titanium strip was drawn for an applied voltage of 3.5 volts.

EXAMPLE 25

A paint was prepared from 3 gm ruthenium trichloride, 12 gm tetra n-butyl orthotitanate in 25 gm of n-pentanol. To this was added and thoroughly mixed 9 gm of calcium silicate of a median particle size 15.5 microns (supplied by Crosfield Chemicals).

This paint composition was formulated to yield a coating comprising 80.2% by volume of calcium silicate in 19.8% of titanium and ruthenium oxides. An anode section was coated with this paint in a similar manner to that described in Example 4 and the sample was subjected to the shorting test described in Example 9. At a depth of 4 mm in a static pool of mercury under 21.5% w/w/ NaCl brine a current of 0.62 amp/cm length of the titanium strip was drawn for an applied voltage of 3.5 volts.

EXAMPLE 26

A paint was prepared from 3 gm ruthenium trichloride, 12 gm tetra n-butyl orthotitanate in 25 gm of n-pentanol. To this was added and thoroughly mixed 9 gm of mullite of a median particle size 39 microns (supplied by Cawoods Refractories Ltd.).

This paint composition was formulated to yield a coating comprising 76.3% by volume of mullite in 23.7% of titanium and ruthenium oxides. An anode section was coated with this paint in a similar manner to that described in Example 4 and the sample was subjected to the shorting test described in Example 9. At a depth of 4 mm in a static pool of mercury 21.5% w/w NaCl brine a current of 1.2 amp/cm length of the titanium strip was drawn for an applied voltage of 3.5 volts.

What we claim is:

1. In an electrode suitable for use as an anode in a mercury cathode cell which comprises a support member made of a film-forming metal or a film-forming metal alloy and an electrocatalytically active coating thereon comprising an electroconducting material selected from the group consisting of platinum group metals, oxides thereof and mixtures of at least one such metal or oxide with one or more non-noble metal oxides, such coating being obtained by thermally decomposing a precursor for each component thereof, the improvement whereby said coating consists of a matrix of said electroconducting material having embedded therein a non-conducting refractory material in discrete form and having a resistivity greater than about 10 ohms-cm, said embedded refractory material being selected from the group consisting of:

(a) particulate non-conducting refractory material wherein the particles have a size range of up to 200 microns, (b) fibrous non-conducting refractory material wherein no dimension of individual fibers exceeds 1 mm and (c) mixtures of such fibrous and particulate refractory material, the embedded refractory material being present in particulate and/or fibrous form in admixture with the precursors for said coating before said precursors are thermally decomposed to form said coating and remaining essentially in said form throughout the preparation of said coating, the proportion of embedded refractory material in the coating being 5% to 95% by volume calculated on the total volume of the components in the coating, said embedded refractory material modifying the surface characteristics of the coating and thereby increasing the electrical contact resistance thereof to mercury with consequent reduction in undesirable shorting effects.

2. An electrode according to claim 1 wherein the non-conducting particulate or fibrous refractory material is selected from the group consisting of oxides, carbides, sulphides, nitrides and fluorides.

3. An electrode according to claim 2 wherein the oxide is a single oxide selected from the group consisting of zirconia, alumina, silica, thorium oxide, titanium dioxide, ceric oxide, hafnium oxide and ditantalum pentoxide.

4. An electrode according to claim 1 wherein the refractory material consists of non-fibrous particles in the size range 0.05 to 200 microns.

5. An electrode according to claim 4 wherein the refractory material is in the size range 0.1 to 75 microns.

6. An electrode according to claim 1 wherein the said support member is made of titanium or an alloy based on titanium and having anodic polarisation properties similar to those of titanium.

7. An electrode according to claim 1 wherein the non-noble metal oxide portion of the said electroconducting material consists of at least one oxide selected from oxides of titanium, zirconium, niobium, tantalum and tungsten, tin dioxide, germanium dioxide and oxides of antimony.

8. An electrode according to claim 1, wherein the said coating consists of a mixture of platinum group metal oxide and a film-forming metal oxide containing 5% to 65% by weight of platinum group metal oxide.

9. An electrode according to claim 8, wherein the said mixture contains 25% to 50% by weight of the platinum group metal oxide.

10. An electrode according to claim 6 wherein the coating on the support member consists of a mixture of ruthenium dioxide and titanium dioxide containing 50% to 75% by weight of titanium dioxide and embedded in the mixture 20% to 90% by volume of non-conducting particulate or fibrous refractory material calculated on the total volume of the components of the coating.

11. An electrode according to claim 10, wherein the said mixture contains 65% to 70% by weight of titanium dioxide.

12. An electrode according to claim 6 wherein the coating on the support member consists of a three-component mixture of 27% to 45% by weight ruthenium dioxide, 26% to 50% by weight titanium dioxide and 5% to 48% by weight tin dioxide and embedded in the mixture 20% to 90% by volume of non-conducting particulate or fibrous refractory material calculated on the total volume of the components in the coating.

* * * * *